Jan. 20, 1942.  H. L. BLOOD  2,270,406
SIZE CONTROLLING MECHANISM FOR BORING MACHINES AND THE LIKE
Original Filed July 21, 1938

Inventor
Harold L. Blood
By Geo. H. Kennedy Jr.
Attorney

Patented Jan. 20, 1942

2,270,406

UNITED STATES PATENT OFFICE 2,270,406

SIZE CONTROLLING MECHANISM FOR BORING MACHINES AND THE LIKE

Harold L. Blood, Worcester, Mass., assignor to The Heald Machine Company, Worcester, Mass., a corporation of Massachusetts Continuation of application Serial No. 220,566, July 21, 1938. This application April 12, 1939, Serial No. 267,383

13 Claims. (Cl. 77—3)

The present application is a continuation of my original application, Serial No. 220,566, filed July 21, 1938, for a Size-controlling mechanism for boring machines and the like, and relates to machines which are used to impart a predetermined finished dimension to corresponding surfaces of a succession of similar workpieces, and the invention is particularly applicable to boring machines where it is customary for the cutting tool to operate on a relatively large number of successive workpieces before there is need to make any adjustment of the tool to compensate for the wearing-away of its cutting surface.

In machines of this character the initially established position of the cutting tool relative to the axis of the work holder for the production of a succession of workpiece bores of a predetermined finished size can generally be maintained without adjustment during the machining of quite a number of successive workpieces by reason of the fact that the tool is of extremely hard material and can operate for a considerable time before perceptible wear occurs. After repeated machining operations are performed by the tool, however, the latter does wear down to such an extent that it is no longer capable without readjustment of imparting the desired finished dimension to the subsequently presented workpieces, since such dimension is dependent upon the distance of the cutting surface of the tool from the axis of rotation of the tool or of the workpiece, as the case may be. Adjustment of the tool is then essential if the successive workpieces are all to be finished to the same established dimension.

In the Blood Reissue Patent No. 20,634, dated January 25, 1938, is disclosed a boring machine organization wherein at the completion of each boring operation, a gage or calipering mechanism is automatically brought into action to test the finished dimension of the workpiece then in the machine,—said mechanism being wholly without influence on the tool in all cases where the desired finished size of the so-tested workpieces has been attained, but said mechanism functioning to produce a wear-compensatory adjustment of said tool if and when the so-tested workpiece has not been finished to the desired size.

My present invention provides a similarly-functioning organization which, however, is of greatly simplified construction, in that it does away with the complicated electrical and mechanical controls employed in the machine of said Blood reissue patent, and utilizes fluid under-pressure as the actuating medium for the gage and for the periodic adjustment of the tool.

Compensation for wear on a rotary boring tool necessitates a very small radial adjustment of the point of the tool relative to its axis of rotation. One of the particular features of the present invention is a boring head incorporating therein a mechanism by which an adjustment of the tool may be procured whether the tool spindle is rotating or stationary, and in which the adjustment will be on the small scale necessary to compensate for wear without advancing the tool too much.

Other and further objects and advantages of the invention will appear from the following detailed description taken in connection with the accompanying drawing in which—

Figure 1:
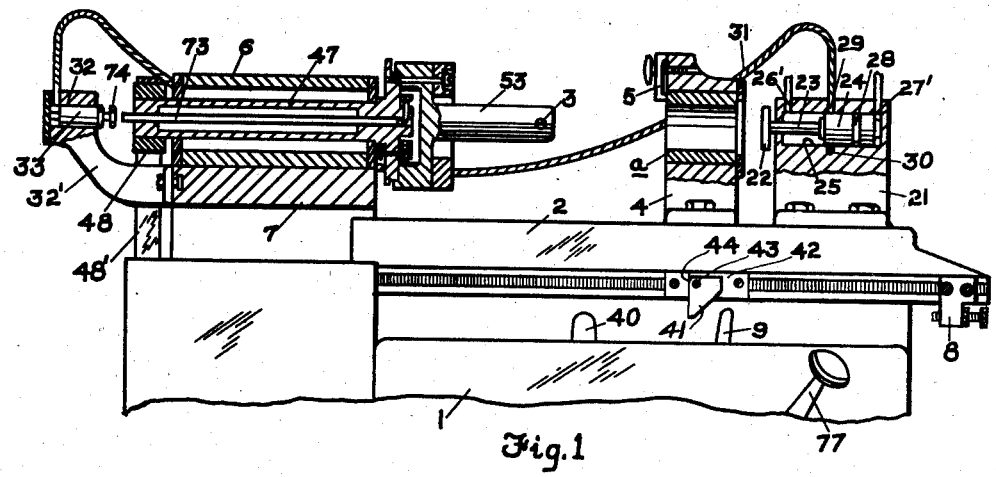
Fig. 1 is a front elevation of a machine embodying the invention, certain of the parts being in section to show the construction.

With reference first to Fig. 1, the invention is shown in connection with a precision boring machine of well known type, as for example, a machine somewhat similar to that of the Blood reissue patent above referred to. In the illustrated machine a base 1 supports a horizontally movable table 2 slidable on ways, not shown, and actuated in any suitable way, as by fluid under pressure to produce a relative traversing movement between a rotary cutting tool 3 and a workpiece a for a longitudinal movement through the workpiece bore of the rotary tool. To obtain this relative movement, either the tool or the workpiece may be carried by the table; as here shown, by way of example, the movable table carries a suitable workholder 4 in which the workpiece a is secured, as by a suitable clamp 5. The tool 3 is rotatively supported in a tool head 6 mounted on a bridge 7 which spans the guideways provided by the machine base. The boring operation occurs when the table 2 moves to the left from the position shown in Fig. 1, to subject the workpiece bore, for its entire length, to the cutting action of the rotating tool 3. The table then reverses, moving back to the position shown in Fig. 1, to permit replacement of the finished workpiece by the next workpiece to be operated upon.

Figure 4:
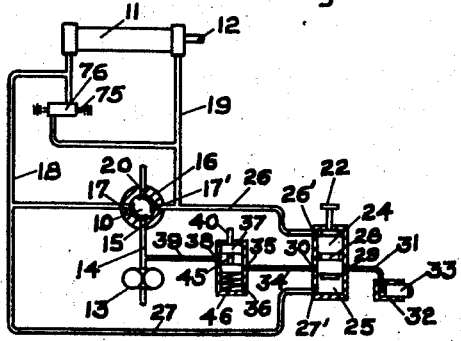
Fig. 4 is an hydraulic diagram.

The reversal of the table 2 is effected when a dog 8 on said table engages a reversing lever 9 which is operatively connected to a reversing valve 10 (Fig. 4) provided in the fluid pressure system by which said table 2 is actuated; such engagement shifts the reversing valve into the position shown by Fig. 4, and causes movement of the table to the right to carry the workpiece to the inoperative position shown by Fig. 1. As the returning table reaches the position of Fig. 1 it is brought to rest by any suitable means, not shown.

Referring now to Fig. 4, the fluid pressure mechanism by which the table is actuated comprises a cylinder 11 mounted within, and held in fixed relation to, the base of the machine. A projecting rod 12 secured to a piston, not shown within said cylinder, is suitably connected to the table 2. Fluid under pressure from a pump 13 is directed through a conduit 14 to an inlet port 15 in the casing 16 of reversing valve 10. Ports 17 and 17' in the casing are connected to the opposite ends of the cylinder 11 by pipes 18 and 19 and the casing 16 is also provided with an exhaust port 20. In response to movements of the valve 10 by the reversing lever 9, fluid under pressure is directed alternately to opposite ends of the cylinder 11 to provide for the longitudinal traversing movements of the table.

Referring now to Fig. 1, the workpiece $a$ is supported with its axis substantially horizontal in the workholder 4, and a housing 21 is mounted on the table in line with the work holder 4 to support a gage 22 in accurate alinement with the bore of the workpiece. The gage is carried by a gage rod 23 extending from a plunger 24 slidable in a horizontal bore 25 in the housing 21. The gage member 22 corresponds in size or diameter to the desired finished dimension of the workpiece bore, and is arranged to be brought into operative relation to each workpiece in the machine, immediately following the action of the rotary boring tool 3 thereon.

With reference again to Fig. 4, the plunger which carries the gage rod is moved toward and away from the workpiece by fluid under pressure. A conduit 26 provides a connection between the pipe 19 and a port 26' at the inner or left hand end of the bore 25 (the upper end, Fig. 4) and a pipe 27 provides a connection between the pipe 18 and a port 27' at the outer or right hand end of the bore 25 (the lower end, Fig. 4). Thus, as the table moves to the left to bring the tool and workpiece into operative relation, fluid under pressure is directed to the left hand end of the bore 25 to hold the gage away from the workpiece and, as the reversing valve is shifted at the left hand end of the table movement, fluid under pressure is directed to the right hand end of the bore 25 to cause a movement of the gage to the left for entry within the workpiece bore if the latter is finished to the desired size.

The gage-moving plunger 24 acts also as a valve and to this end has a centrally located groove 28 which in the above-described extreme positions of said plunger is out of line with opposed ports 29 and 30, the former being connected by a suitable conduit 31 to a bore 32 provided by a bracket 32' extending rearwardly from the toolhead 7; said bore 32 contains a slidable plunger 35, for a purpose to be hereinafter described. The port 30 is connected by a conduit 34 to a port 35 in a casing 36 (Fig. 4) which contains a vertically slidable piston valve 37, consisting of two piston portions separated by a reduced portion 45. The casing 36 has a port 38 connected by a conduit 39 to the conduit 14 between the pump 13 and the reversing valve casing 16.

The valve 37 has an upwardly projecting stem 40, which, as best shown in Fig. 1, is in a position to be engaged by a pivotally mounted dog 41 carried by a block 42 laterally adjustable on the front of the table. The dog 41 is pivoted on a pin 43 and is free to rock counterclockwise to allow the dog to pass without effect over the upper end of the stem 40 during movement of the table to the left. Upon movement of the table to the right, however, the swinging movement of the dog 41 is limited by a shoulder 44 on the block and thus the dog forces the valve 37 downwardly to provide fluid connection between ports 35 and 38 around the reduced central portion 45 of the valve. The valve 37 is normally held in the upper position shown by a coil spring 46.

If the gage 22, on its above-described movement to the left as the tool 3 is withdrawn from a workpiece bore, is unable to enter said bore, that is its full movement to the left being prevented by engagement between the gage and the end of the workpiece by reason of the workpiece bore being too small, then the reduced portion 28 of the plunger 24 establishes a fluid connection from the port 35 to the bore 32 containing the plunger 33. When the valve 37 is subsequently shifted downwardly by the dog 41, during movement of the table to the right, fluid under pressure enters the bore 32 to produce a movement of the plunger 33 to the right, this causing, as hereinafter described, the actuation of a mechanism which automatically repositions the tool 3 so that its next-ensuing operations will produce workpiece bores of the desired size. On the other hand, whenever said gage 22 can make its full left hand movement into the bore of any workpiece that has been operated upon by tool 3, then the ports 29 and 30 are closed off from each other by the valve 24, in consequence of which no such tool-compensating movement of the plunger 33 can occur.

Figure 2:
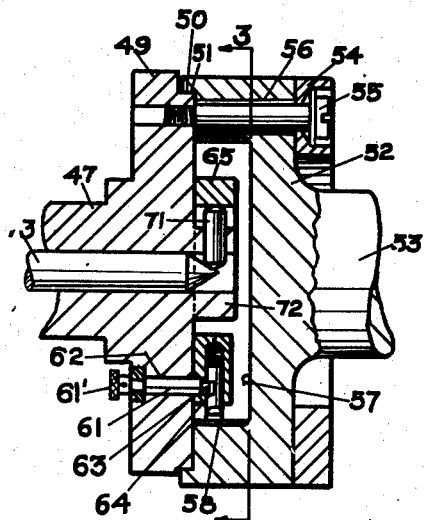
Fig. 2 is an enlarged vertical section through the end of the tool spindle.

Referring now to Fig. 1, the toolhead of the invention, which is mounted on the bridge 7, supports a rotatably mounted hollow spindle 47, the left hand end of which carries a pulley 48 by which the spindle is rotated, as by a belt 48'. On the right hand end of the spindle 47, as shown in Fig. 2, is provided a preferably integral flange or plate 49, whose face is shouldered as shown at 50 to form thereon a circular projection slightly eccentric to the axis of rotation of the spindle 47, fitted to this eccentric circular projection is a circular recess provided by a corresponding internal shoulder 51 of a cap member 52. The cap has a centrally extending stub shaft 53, in the end of which the boring tool 3 is positioned, the latter extending radially of the shaft in the usual manner. The shaft 53 is concentric with the shoulder 51 and thus a turning of the cap 52 relative to the flange 49 will adjust the projecting end of the tool toward or away from the axis of rotation of the spindle, dependent upon the position of the cutting point of the tool with relation to the eccentricity of the shoulder 51. A suitable ring 54 holds the cap 52 against the flange 49 through the medium of bolts 55 which extend through elongated arcuate slots 56 in the cap 52. The bolts hold the cap 52 frictionally against the flange 49 to permit of a relative turning movement between the cap and the flange, when desired.

Figure 3:
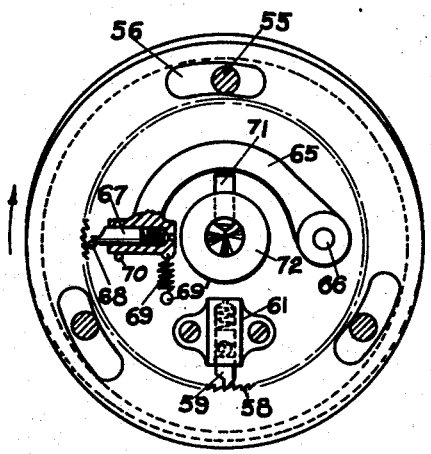
Fig. 3 is a sectional view along the line 3—3 of Fig. 2.

The cap has a central internal recess 57 having a plurality of ratchet teeth 58 on the inner cylindrical surface thereof, the teeth being in a position to be engaged by a spring-pressed pawl 59 slidable in a bracket 60 mounted on the end face of the flange 49. A pin 61, which is turnable in a small diameter bore 62 in the flange 49, has an eccentrically positioned projection 63 on the inner end thereof engaging in a slot 64 in the side of the plunger 59. Rotation of the pin 61 by means of the knurled knob 61' on its outer end provides for withdrawing the plunger from engagement with the ratchet teeth, when manual adjustment of the tool, by movement of the cap 52 relative to the flange or plate 49, is desired. The pawl 59 holds the flange 49 and cap 52 against relative turning movement in one direction. It will be understood that the spindle 47 rotates, during the boring operation, in the direction of the arrow, Fig. 3.

On the end face of the flange 49 is carried a lever 65 the same being pivoted on a pin 66 projecting from said face at one side of the spindle axis. The free end of the lever 65, on the other side of the spindle axis has an outwardly extending spring-pressed pawl 67 normally held in inoperative position by engagement with a pin 68 projecting from the end face of the flange 49. A coil spring 69 connected to the lever 65 and to a pin 69' on the end face of the flange 49 normally holds the lever in the position of Fig. 3 and against a pin 70 which limits the counter-clockwise (Fig. 3) movement of the lever. A radially extending plug 71 engages with the lever midway between its fulcrum pin 66 and the free end thereof, the plug being slidable in a centrally projecting boss 72 on the flange 49.

For cooperation with plug 71, the spindle 47 has a centrally positioned rod 73 axially slidable therein, the inner end of the rod, as shown in Fig. 2, being conical for engagement with the inner end of the plug 71, whereby right hand movement of the rod, Fig. 2, produces movement of the plug outwardly to rock the lever 65, against the pull of spring 69, and thereby engage the pawl 67 with the teeth 58 of cap 52, for a minute adjustment of the tool 3. The outer or left hand end of the rod 73 is in the path of the head of a bolt 74 adjustably mounted in the end of the plunger 33. Thus the rod 73 is actuated, to obtain, as above described, a readjustment of the tool's position, only in those instances when a workpiece which has been operated upon by said tool, is nevertheless not bored out to a sufficient size to permit the entry of the gage 22.

The boring tool may be rotated continuously or may be started and stopped at the beginning and end of each boring operation under the control of the same mechanism which controls the movements of the table. A suitable clutch and brake mechanism of any well known character is utilized for this purpose and the clutch and brake are under the control of a plunger 75 slidable in a casing 76 connected into the fluid pressure system and under the control of the reversing valve 10. As this is not a feature of the invention it need not be described in detail, except to note that the compensation for wear on the tool occurs entirely independently of the tool rotation.

In the operation of the machine a workpiece $a$ having been positioned in the workholder 4 and secured therein by the clamp 5, a movement of the table to the left for a boring operation is procured by manual shifting of the reversing lever 9, either directly, or through the medium of a control lever 77 on the front of the machine. The table moves to the left carrying the workpiece past the cutting point of the rotating boring tool, for a machining operation on the workpiece bore. During this movement of the table to the left the gage is held in the position shown (Fig. 1) by fluid under pressure against the left hand end of the plunger 24. After the cutting point of the tool passes beyond the right hand end of the workpiece the table is reversed by the engagement of dog 8 with the lever 9, to initiate the withdrawal of the tool from the workpiece bore.

Upon this reversal of the table at the left hand end of its movement, fluid under pressure is directed against the right hand end of the plunger 24, moving the gage to the left and into the bore of the workpiece which has just been bored, provided said bore is finished to the desired size. In those instances that the gage enters the workpiece bore, indicating that the boring operations performed thereon has produced the desired size, no fluid under pressure is admitted against the plunger 33 since the ports 29 and 30 are kept from communicating with each other by the plunger 24 which has been permitted, by full entry of gage 22 into the workpiece bore, to move to its extreme left hand position. In the regular and ordinary operation of the machine on a succession of similar workpieces, such entry of the gage 22 into the successively finished bores will be permitted usually by quite a number of consecutive workpieces, and while these conditions prevail there will be no changes produced in the relative positions of the cutting point of the boring tool and the workpiece and tool axes.

However, as the result of the gradual wearing down of the tool 3, from a number of such boring operations, said tool may ultimately produce a bore which is undersize, that is, a bore not large enough to permit the entry of the gage 22. When this occurs, on the right hand or withdrawal movement of table 2, the usual movement of the gage to the left is limited by contact between the gage and the end of the workpiece, thereby stopping the plunger 24 in mid-position, and establishing fluid connection between the ports 29 and 30. Accordingly, later on in this right hand withdrawal movement of the table, when the dog 41 engages and depresses the stem 40 of valve 37 (just after the workpiece $a$ has moved clear of tool 3) the fluid under pressure from pump 13 is admitted by reduced portion 45 of valve 37 to conduit 34, and this fluid, by reason of the stoppage of plunger 24 in mid-position, in the situation above described, is admitted to the casing 32, thereby moving the plunger 33 and shifting the rod 73 to the right.

As above stated, movement of the rod to the right moves the plug 71 outwardly, thereby rocking the lever 65 to cause the pawl 67 to engage the ratchet teeth 58 and to impart a slight relative turning movement between the flange 49 and the cap 52. Since the cap 52 is eccentric to the axis of the spindle 47, the effect of this slight relative turning movement is a radially outward movement of the cutting point of the boring tool relative to the axis of the spindle. Following such repositioning of the tool 3 (to insure the boring of subsequent workpieces to the desired size) the parts are returned to normal position by the spring 69, and the machine operations continue under these conditions until such time as further wearing down of said tool causes the machine to produce another undersized bore, whereupon occurs, in the manner above described, another automatic repositioning of the tool 3, to compensate for such wear.

I claim:

1. In a machine of the class described, a boring head comprising a housing, a spindle journalled therein, a member eccentrically mounted on the end of the spindle, a boring tool carried by the member, a rod axially slidable in the spindle, and means responsive to movement of the rod for shifting the member angularly on the spindle, said means including a pawl and ratchet on the spindle and member and connections between the pawl and rod.

2. In a machine of the class described, a boring head comprising a housing, a spindle journalled therein, a member eccentrically mounted on the end of the spindle, a boring tool carried by the member, means for holding the member and spindle against relative angular movement in one direction, a rod axially slidable in the spindle, and means responsive to movement of the rod and operative independently of the rotation of the spindle for shifting the member angularly of the spindle in the opposite direction.

3. In a machine of the class described, a boring head comprising a housing, a spindle journalled therein, a member eccentrically mounted on the end of the spindle, a boring tool carried by the member, a pawl for normally holding the member and spindle against relative angular movement in one direction, a rod axially slidable in the spindle, and means responsive to movement of the rod for shifting said member angularly of the spindle in the opposite direction, said last means including a pawl and ratchet on the spindle and member and connections between said pawl and the rod.

4. In a machine of the class described, a boring head comprising a housing, a spindle journalled therein, a member eccentrically mounted on one end of the spindle, a boring tool carried by the member, a rod axially slidable in the spindle and means responsive to movement of the rod for shifting said member angularly on the spindle, said means including a pawl rockably mounted on the end of the spindle, a ratchet on the member and engageable by said pawl, and connections between said pawl and the rod, including a pin engageable with the pawl and rod and movable endwise by endwise movement of the rod.

5. In a machine of the class described, a boring head comprising a housing, a spindle journalled therein, a member eccentrically mounted on the end of the spindle, a boring tool carried by the member, a rod axially slidable in the spindle, means responsive to movement of the rod for shifting the member angularly on the spindle, said means including a pawl and ratchet on the spindle and member and connections between the pawl and rod, and an additional pawl engageable with said ratchet for releasably holding the member against turning movement on the end of the spindle.

6. In a machine of the class described, a boring tool and a workholder, means for imparting rotation to one of said parts, and means for traversing one part, reciprocatively, of the other, to obtain, by one stroke of said traverse the boring of each successive workpiece in said workholder to a dimension determined by the distance of said tool's cutting point from the axis of said rotation, and by the reverse stroke, a withdrawal of said tool from the workpiece bore, a source of fluid under pressure, a tool-repositioning means, an actuator therefor operable by pressure fluid from said source, a gage alined with said workholder to test the bore size of each workpiece, and a device moved by said pressure fluid on each boring stroke of said traverse to space said gage away from the workpiece bore and moved reversely by fluid pressure on each reverse stroke of said traverse to urge said gage toward and into said bore, said device normally preventing the flow of pressure fluid from said source to said actuator, but having a passage which is brought into position to permit said flow, for the operation of said tool-repositioning means, only in response to the non-entry of said gage into a workpiece bore.

7. In a machine of the class described, a boring tool and a work holder, means for imparting rotation to one of said parts, and means for traversing one part, reciprocatively, of the other, to obtain, by one stroke of said traverse the boring of each successive workpiece in said workholder to a dimension determined by the distance of said tool's cutting point from the axis of said rotation, and by the reverse stroke, a withdrawal of said tool, from the workpiece bore, a source of fluid under pressure, a tool-repositioning means, an actuator therefor operable by pressure fluid from said source, a gage alined with said workholder to test the bore size of each workpiece, a device moved by said pressure fluid on each boring stroke of said traverse to space said gage away from the workpiece bore and moved reversely by fluid pressure on each reverse stroke of said traverse to urge said gage toward and into said bore, said device normally preventing the flow of pressure fluid from said source to said actuator, but having a passage which is brought into position to permit said flow for the operation of said tool-repositioning means, only in response to the non-entry of said gage into a workpiece bore, and valve means for preventing flow of pressure fluid from said source to said actuator except on said withdrawal stroke of the traverse after said tool is clear of the workpiece bore.

8. In a machine of the class described, a boring tool and a workholder, means for imparting rotation to one of said parts, and means for traversing one part, reciprocatively, of the other, to obtain, by one stroke of said traverse the boring of each successive workpiece in said workholder to a dimension determined by the distance of said tool's cutting point from the axis of said rotation, and by the reverse stroke, a withdrawal of said tool from the workpiece bore, a source of fluid under pressure, a tool-repositioning means, an actuator therefor operable by pressure fluid from said source, a gage alined with said workholder to test the bore size of each workpiece, means operated by said pressure fluid for moving said gage away from a workpiece bore on each boring stroke and toward said bore on each withdrawal stroke, a pair of valves normally closed to prevent passage of pressure fluid from said source to said actuator, one of said valves being associated with said last-named means to open only in response to non-entry of said gage into a workpiece bore, and means for opening said other valve momentarily, on each withdrawal stroke of said traverse after said tool is clear of the workpiece bore.

9. In a boring machine, a rotary tool spindle, a member rotatable with said spindle and mounted eccentrically thereon, a boring tool carried by said member and projecting therefrom substantially radially of the spindle axis, a rod axially slidable in said spindle, and means for converting said rod's endwise movement, in one direction only, into angular movement of said member, in such direction as to increase the radial projection of said tool from said spindle axis.

10. In a boring machine, a rotary tool spindle, a member rotatable with said spindle and mounted eccentrically thereon, a boring tool carried by said member and projecting therefrom substantially radially of the spindle axis, a rod axially slidable in said spindle, a gage for testing the bore size of each workpiece operated on by said tool, means responsive to non-entry of said gage into any workpiece bore for moving said rod endwise, and means for converting such endwise movement of said rod into a predetermined angular movement of said member in such direction as to increase the radial projection of said tool from said spindle axis.

11. In a boring machine, a rotary tool spindle, a member rotatable with said spindle and mounted eccentrically thereon, a boring tool carried by said member and projecting therefrom substantially radially of the spindle axis, a rod axially slidable in said spindle, a gage moved by fluid pressure after each boring operation of said tool, to test the bore size of the workpiece then in the machine, fluid pressure means operable in response to non-entry of said gage into the workpiece bore for moving said rod endwise, and means for converting such endwise movement of said rod into a predetermined angular movement of said member in such direction as to increase the radial projection of said tool from said spindle axis.

12. In a boring machine, a rotary tool spindle, a member rotatable with said spindle and mounted eccentrically thereon, a boring tool carried by said member and projecting therefrom substantially radially of the spindle axis, a rod axially slidable in said spindle, and a pawl and ratchet mechanism actuated by movement in one direction of said rod for causing predetermined angular movements of said member to vary the radial projection of said tool from the spindle axis.

13. In a boring machine, a rotary tool spindle, a member rotatable with said spindle and mounted eccentrically thereon, a boring tool carried by said member and projecting therefrom substantially radially of the spindle axis, a rod axially slidable in said spindle, a pawl carried by said spindle and adapted to be actuated by the endwise movement in one direction of said rod, a ratchet on said member for cooperation with said pawl, whereby angular movement of said member to change the radial projection of said tool from said spindle axis is obtained by each such movement of rod, and a spring for returning said pawl and said rod to normal position.

HAROLD L. BLOOD.